US011385863B2

(12) United States Patent
Chalamalasetti et al.

(10) Patent No.: US 11,385,863 B2
(45) Date of Patent: Jul. 12, 2022

(54) ADJUSTABLE PRECISION FOR MULTI-STAGE COMPUTE PROCESSES

(71) Applicant: HEWLETT PACKARD ENTERPRISE DEVELOPMENT LP, Houston, TX (US)

(72) Inventors: Sai Rahul Chalamalasetti, Palo Alto, CA (US); Paolo Faraboschi, Palo Alto, CA (US); Martin Foltin, Ft. Collins, CO (US); Catherine Graves, Palo Alto, CA (US); Dejan S. Milojicic, Palo Alto, CA (US); Sergey Serebryakov, Palo Alto, CA (US); John Paul Strachan, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 774 days.

(21) Appl. No.: 16/052,218

(22) Filed: Aug. 1, 2018

(65) Prior Publication Data

US 2020/0042287 A1 Feb. 6, 2020

(51) Int. Cl.
*G06F 7/483* (2006.01)
*G06N 3/08* (2006.01)
*G06N 3/063* (2006.01)

(52) U.S. Cl.
CPC ............ *G06F 7/483* (2013.01); *G06N 3/063* (2013.01); *G06N 3/08* (2013.01)

(58) Field of Classification Search
CPC ..................................................... G06F 7/483
See application file for complete search history.

(56) References Cited

U.S. PATENT DOCUMENTS

| 6,882,992 B1 | 4/2005 | Werbos et al. |
| 2011/0029471 A1 | 2/2011 | Chakradhar et al. |
| (Continued) | | |

FOREIGN PATENT DOCUMENTS

| CN | 103472724 | 3/2016 |
| CN | 107153522 | 9/2017 |

OTHER PUBLICATIONS

Na, T. et al.; "Speeding Up Convolutional Neural Network Training with Dynamic Precision Scaling and Flexible Multiplieraccumulator"; Aug. 8-10, 2016; 6 pages.

(Continued)

*Primary Examiner* — Michael J Metzger
(74) *Attorney, Agent, or Firm* — Nolte Lackenbach Siegel

(57) ABSTRACT

Disclosed techniques provide for dynamically changing precision of a multi-stage compute process. For example, changing neural network (NN) parameters on a per-layer basis depending on properties of incoming data streams and per-layer performance of an NN among other considerations. NNs include multiple layers that may each be calculated with a different degree of accuracy and therefore, compute resource overhead (e.g., memory, processor resources, etc.). NNs are usually trained with 32-bit or 16-bit floating-point numbers. Once trained, an NN may be deployed in production. One approach to reduce compute overhead is to reduce parameter precision of NNs to 16 or 8 for deployment. The conversion to an acceptable lower precision is usually determined manually before deployment and precision levels are fixed while deployed. Disclosed techniques and implementations address automatic rather than manual determination or precision levels for different stages and dynamically adjusting precision for each stage at run-time.

20 Claims, 9 Drawing Sheets

(56) References Cited

U.S. PATENT DOCUMENTS

| | | |
|---|---|---|
| 2017/0024644 A1 | 1/2017 | Van Der Made et al. |
| 2017/0236051 A1 | 8/2017 | van der Made et al. |
| 2018/0268258 A1* | 9/2018 | Tapia .................. G06F 15/76 |
| 2019/0347553 A1* | 11/2019 | Lo .................. G06F 7/5443 |

OTHER PUBLICATIONS

Szymon Migacz, "8-bit Inference with TensorRT", May 8, 2017, 41 pages.

Taras et al., "Investigating the Effects of Dynamic Precision Scaling on Neural Network Training", Jan. 2018, 8 pages.

Zhou et al., "Adaptive Quantization for Deep Neural Network", Dec. 2017, 14 pages.

* cited by examiner

ADJUSTABLE PRECISION FOR MULTI-STAGE COMPUTE PROCESSES

BACKGROUND

A neural network is an artificial network with an input layer, an output layer, and at least one hidden layer in between. A neural network may be trained using at least two different styles of training, for example, supervised training and unsupervised training. When performing a supervised training "session," both inputs and outputs are provided to the neural network. Accordingly, supervised training involves providing the neural network with the desired output either by manually grading the network's performance, or by providing desired outputs with inputs. In a different approach, unsupervised training involves the neural network having to determine the outputs without an outside reference. As part of the training process for a neural network, different levels of precision (e.g., 32-bit vs 16-bit vs 8-bit) for processing aspects (e.g., different layers or types of inputs) may be used and are typically manually adjusted as part of the training. Neural networks are commonly developed and trained with 16-bit or 32-bit floating-point numbers. Training with 16-bit or 32-bit floating-point numbers provides a high degree of precision in the neural network.

Once training for a neural network is considered complete, the neural network may then be deployed into a production mode for analysis of input data. If compute resources are not a concern, an overprovisioned neural network may be deployed where resources are over allocated to ensure accuracy. Overprovisioning generally allocates more resources than necessary to every action and therefore may not optimize resources. In situations where optimization of resources is taken into account, a deployed neural network will typically have each of the different levels of precision fixed (e.g., set statically). These static and pre-determined (e.g., manually) levels of precision may then remain in place while the neural network performs its intended function. To increase the speed of the neural network, however, parameter precision may be later reduced to a less than 32-bit resolution (e.g., 16-bit or 8-bit resolution). Once precision has been reduced, the remaining parameter precision from the lower resolution may result in lower power consumption of computer systems used for production implementation of the neural network, lower memory requirements for the neural network, and lower response latency resulting in a higher throughput of the neural network. This change to a lower precision should not be made arbitrarily. Typically, the affect and availability of conversion to a lower resolution is determined before the neural network is placed into a production implementation (e.g., determined as part of the training process or a one-time calibration process after the training). In other words, an initial high precision neural network of 16-bit or 32-bit floating-point numbers, may be converted from 16-bit precision to 8-bit precision, or from 32-bit precision to 16-bit precision or to 8-bit precision. While overall processing times may be reduced, the converted neural network then becomes fixed, or static, at the lower resolution.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
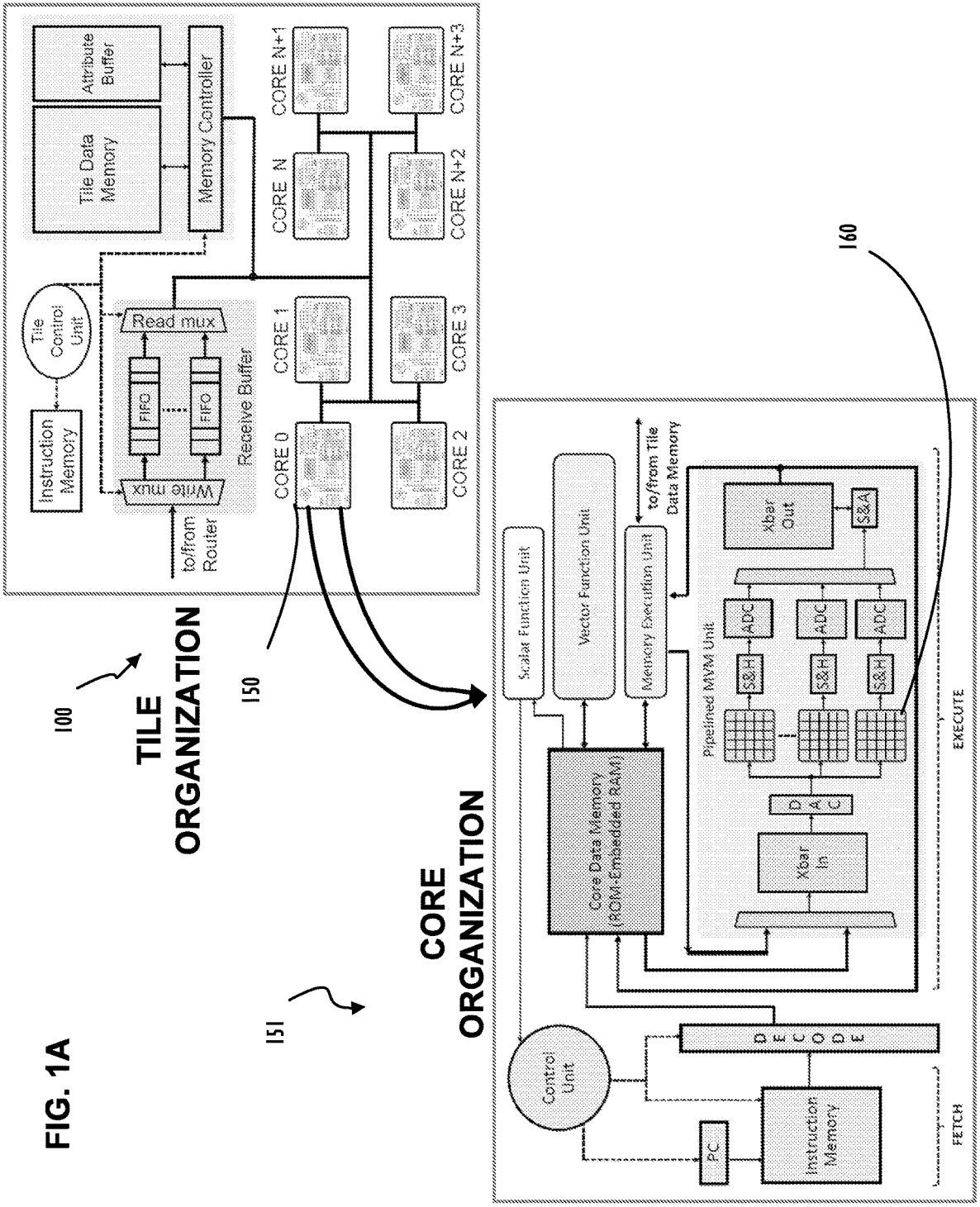
FIG. 1A is a block diagram representing one possible tile organization on an integrated circuit (IC) and a core organization for an example core from a possible plurality of cores on the IC, according to one or more disclosed example implementations.

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

To address overall performance of a neural network and reduce manual intervention or complexity of neural network training sessions, the disclosed Tunable and Dynamically Adjustable Precision for Multi-Stage Compute Processes method and system represent an improvement to the art of neural network processing (e.g., on a memristor crossbar architecture) and other types of multi-stage processing (e.g., image processing) where variable levels of precision may be used. In particular, and not by way of limitation, this disclosure presents implementations of a system and method to improve the technological field of computer processing by using a dot product engine (DPE) matrix crossbar analog based processor (as an example) configured to process different portions of a compute task using automatically determined, adjustable levels of precision. For example, levels of precision may be automatically determined at run-time rather than manually determined and set prior to processing. Further, dynamic adjustment may allow for a level of adjustment based on possibly competing factors of power consumption, processing accuracy, processing speed, and overall utilization of processor resources (e.g., area of a DPE crossbar matrix or resource uses of other computer processor architectures).

Some example implementations of the present disclosure are directed to a memristive dot-product system for vector processing, and related method and non-transitory computer storage device. The storage device storing instructions operable to cause one or more computer processors to perform the method. Although a memristive dot-product system for vector processing (e.g., dot product engine DPE) is used for some examples of this disclosure, different types of processing systems (e.g., an IC with digital matrix-vector multiplication units, a graphics processing unit GPU, etc.) may also benefit, and be used, in accordance with disclosed techniques for varying precision at different stages of a multi-stage compute process.

Neural Networks, image processing (e.g., graphics processing), and massively parallel processing on a GPU (e.g., general purpose graphics processing unit GPGPU) are examples of devices and types of processing that may lend themselves to a multi-stage compute process. In general, a multi-stage compute process refers to a computer processing algorithm where outputs from a previous stage (e.g., calculation) may be used as inputs to one or more subsequent stages. That is, each stage builds on the results of the previous stage or stages. In image processing, these stages are sometimes referred to as parts of a graphics "pipeline" while, in neural network implementation, stages may be referred to as layers of the neural network. In any case, the general concept is the same, in that, outputs of previous processing feed inputs (possibly along with other data) of subsequent processing. Accordingly, disclosed techniques of varying precision automatically for different processing "phases" or stages may benefit algorithms that work in this multi-stage manner.

Neural networks are usually trained with 32 or 16-bit floating-point numbers. Once trained, a neural network may be deployed in production (e.g., put into actual use). Depending on the neural network and the run-time hardware, a common approach to achieve performance improvement is to reduce parameter precision of the trained neural network to 16 or 8 bits. Prior to deployment, analysis may be performed to ensure that this conversion to a fixed lower precision does not significantly hurt neural network accuracy. In some implementations, reduced precision may result in an overall saving of compute resources. For example, lower power consumption, lower memory requirements, and lower response latencies that may then result in higher throughput. Typically, conversion to lower precision has been previously determined by an engineer before deployment of a multi-stage compute process. Once a precision determination has been done, precision for each different stage (e.g., layer of a neural network) becomes fixed and gets deployed. In contrast, disclosed implementations may dynamically change precision for each stage. That is, for neural network parameters, precision may be dynamically changed on a per-layer basis. Changes to precision that are made dynamically may depend on several factors determined at run-time in addition to information learned during training. Thus, dynamic precision changes, according to disclosed implementations, may be based, in part, on properties of incoming data streams and per-layer performance of a neural network. Similar dynamic changes may also be utilized in implementations for processing systems other than neural networks.

As briefly mentioned above, training of a neural network model may be performed at different levels of precision (e.g., 16-bit, 32-bit, 64-bit floating-point accuracy of network weight). A neural network model typically has multiple network layers all trained at the selected floating-point accuracy. Model weights from the trained neural network may be re-quantized to lower accuracy, for example from 32-bit to 16-bit. The same re-quantization accuracy is typically used for all network layers. That is, when adjustment is made manually prior to production, a reduction in accuracy from 32-bit to 16-bit would be applied to each of the network layers. Alternatively, different precision may be selected for Feature Extraction and Classification layers, but in a non-dynamic or automatic model (i.e., manual training model) this is done statically, once before production, and without consideration of the incoming live data and desired power consumption, processing accuracy, processing speed, and overall utilization of processor resources at run time. This conversion to the lower accuracy usually involves determination of a weight threshold for each network layer. In the conversion process, weights with absolute value lower than this weight threshold are typically scaled linearly from the initial floating-point number (for example, from a 32-bit floating-point accuracy) to a fixed precision integer number (for example, an 8-bit integer value). Weights with an absolute value larger than the threshold value saturate at maximum positive or negative value that may then be represented in the chosen integer precision.

For readability of this disclosure, a brief overview is provided next. This brief overview is followed by a discussion of architectural considerations (e.g., for a DPE architecture), and then a discussion of possible techniques for implementation of a multi-stage variable precision compute process. Many different architectures of processors may be used to implement the techniques of this disclosure. A DPE is illustrated to highlights its further capability to selectively power and process only on a sub-portion of the crossbar array. Thus, the DPE is used to represent an example of a processor that may also be able to adjust and conserve resources in accordance with disclosed implementations. Other types of processors may also have similar dynamic resource utilization capabilities and may similarly benefit from the disclosed techniques.

The first part of this disclosure references dynamically (at run-time) measuring accuracy of each layer in a neural network and, if it is higher than desired, reducing precision of individual computing elements. This measuring and reduction technique may further use adjusted quantized weights from training and as a result determine that fewer computing elements may be used for an individual stage. Thus, leading to higher performance and lower power consumption.

In another possible implementation, resources may be saved by reducing the bit-precision of the converters that take the analog DPE results into the digital domain. These ADCs are typically used at the highest resolution, but performance may be improved (lower power, higher throughput) if precision is reduced. This reduction of converter precision may also reflect a more immediate change than changing the DPE bit-precision which may still retain the higher analog precision despite the directive to reduce this precision.

In yet another possible implementation, resource saving could be accomplished by reducing the number of "shift-and-add" steps used in DPE matrix computations. Normally, the input is applied to memristor crossbar arrays one bit at a time. The results of each computation are shifted (equivalent to multiplying by 2) and then added to the next 1-bit input computation. With lower bit-precision requirements, the input bit stream may be truncated to only the most-significant bits, thus speeding up computation and yielding lower final bit-precision.

A second part of this disclosure explains that the overall target classification accuracy may be reached when using a variable precision across the various neural network layers. We will contrast the method used in this disclosure with a static approach commonly used in the industry. In a static approach, a certain fixed precision is selected for each layer. Higher precision trained model weight values smaller than a variable saturation threshold are scaled proportionally to fit to this lower precision. A saturation threshold may be determined separately for each network layer.

In this disclosure techniques are explained to not only vary the saturation threshold but also vary the weight accuracy (e.g., between 8-bit, 10-bit, 6-bit, and 4-bit integer), and for each layer select a combination of saturation threshold and lowest weight accuracy that satisfy a predetermined classification error criterion. For example, as measured in the example of FIG. 4A. This classification criteria may be derived by various methods. In one possible implementation, classification criteria may be obtained by dividing a total acceptable classification error by a per layer activation error limit using suitable heuristics.

A third part of this disclosure refers to techniques and systems that minimize the number of resistive memory compute elements (e.g., memristors) required for desired classification accuracy of neural network inference by employing weights with variable precision at each network layer using variable quantization of weights from model training. That is, reduction of network weight accuracy may lead to reduction in the number of resistive memory compute elements required for classification accuracy. This may be, in part, because a compute element may only be able to store weights at 2-bit, 4-bit or 6-bit accuracy. Accordingly, with 2-bit per compute element, 4 elements are required to support the typically used 8-bit integer accuracy, whereas only 2 and 3 elements are required for 4-bit and 6-bit accuracy, respectively. Reduction in the number of required compute elements may allow for any "freed-up" (e.g., not used because of lower precision setting) elements available on the silicon die to be allocated to different tasks—for example, to support a higher number of duplicated matrices for network layers with high throughput (for example, the first network layers in Convolutional Neural Networks) to increase the accelerator performance. Or, for smaller networks it may be possible to duplicate all matrices in the network for even higher performance on a batch of input data.

Turning now to example hardware architectures that may be utilized for a dynamic precision multi-stage compute process, according to disclosed implementations, a dot-product engine (DPE) may be implemented on an integrated circuit (IC) as a crossbar array that includes memory elements at each crossbar intersection. Memory elements may include a memristor and a transistor in series to store an input voltage and/or current value. A crossbar with N rows, M columns may have N×M memory elements that may be used to calculate the dot-product (matrix multiplication) of two matrices of up to an N×M size. The IC may provide a vector input for N voltage inputs to the crossbar array and a vector output for M voltage outputs from the crossbar array. The IC may further include an analog-to-digital converter (ADC) and/or a digital-to-analog converter (DAC) coupled to each input/output register. Values representative of a first matrix may be stored in the crossbar array as a programmable resistance value. Voltages/currents representative of a second matrix may be applied to the crossbar. Ohm's Law and Kirchoff's Law may be used in calculations to determine values representative of the dot-product as read from outputs of the crossbar. In this manner, a DPE allows for in situ calculation of the dot-product of two matrices.

The DPE engine represents an analog computation device. A memristor crossbar array structure can carry out vector-matrix multiplication. By applying a vector of voltage signals to the rows of a memristor crossbar array, multiplication by each element's programmed conductance is carried out. The memristor crossbar array structure may be further configured to accelerate performance of vector data set calculations over traditional digital ASIC processing. To reduce precision, and correspondingly reduce resource overhead, it may be possible to perform a calculation using only a portion of the crossbar array at a desired precision level. For example, by only providing power to selected rows and columns. Alternatively, reduced precision (e.g., smaller) DPE crossbars may be included on an IC along with larger DPE crossbars and, based on the desired precision, calculations may be directed to the smallest available (e.g., most resource efficient) crossbar at run-time.

In one example implementation, a crossbar array includes a number of memory elements. Each memory element may include a memristor and a transistor in series with one another. The crossbar array has N rows, M columns and N×M memory elements. A vector input register has N voltage inputs to the crossbar array. A vector output register has M voltage outputs from the crossbar array. An analog-to-digital converter (ADC) may be electronically coupled to the vector output register. A digital-to-analog converter (DAC) may be electronically coupled to the vector input register. As stated above, the disclosed crossbar array may be used to calculate the dot-product of two matrices up to N×M in size. However, there are times a dot-product may need to be calculated for a smaller input and output matrix. Accordingly, some number less than N and M will be used to perform the dot-product calculation (e.g., only a portion of the crossbar array). Disclosed variable precision techniques may be used to calculate at a reduced precision to conserve compute resources (e.g., power, memory, processing) for the analog calculation provided by the crossbar and the conversion performed by the ADC/DAC. That is, there may be unused rows and columns of the crossbar, reduced precision conversions, or smaller crossbar arrays may be utilized when performing a calculation.

Disclosed example implementations may provide for a variable precision scheme where the degree of precision may be varied as necessary along with selection of Core and Tile (See FIG. 1) depending on the application's requirements. That is, the user and the library may have an effect on how processing is dynamically tuned throughout an overall set of potentially related calculations (e.g., a processing pipeline). In some implementations and for some types of computational pipelines, the degree of precision may be dynamically adjusted on-the-fly (e.g., just-in-time at run-time).

Referring now to FIG. 1A, an example memristive crossbar array is now described for use in dot-product matrix calculations with dynamically tunable precision as discussed above. While a particular example of a memristive crossbar array is described, other configurations of memristive crossbar arrays may be used. FIG. 1A illustrates a memristive dot-product engine (DPE) 160 in the context of an integrated circuit (IC), also referred to as the dot-product system, configured as part of a pipelined Matrix Vector Multiplications (MVM) Unit. DPE 160 is shown using a schematic diagram in FIG. 1B and another example of a dot-product engine similar to DPE160 is shown and discussed in more detail in FIG. 2 below.

In the context of an integrated circuit (IC) there are many possible Tile organizations and hardware module components may be arranged in many different ways based on the requirements of the particular IC being designed or fabricated. IC 100 is illustrated in FIG. 1A with a plurality of cores labeled CORE 0 (150) through CORE 3 and CORE N through CORE N+3. Multiple cores may be used to perform functions on a given IC in parallel and may also be used to implement a system on a chip (SOC) processing unit. Each core may be organized consistently with other cores on the same IC or different cores may be designed and implemented to perform different functions (e.g., at different degrees of precision). At run-time it may be possible to select a particular core to execute a given task or some tasks may be portable across almost all cores (if not all). Core organization 151 illustrates how a core including a crossbar matrix may be implemented. Many different implementations are possible.

DPE 160 may be implemented as part of another processor and may be integrated into or communicatively coupled to one or more central processing units (CPUs), semiconductor-based microprocessors, and/or other hardware devices suitable for retrieval and execution of instructions stored in machine-readable storage medium. The processor equipped with a DPE may fetch, decode, and execute instructions, to control processes for performing matrix multiplication with dynamic precision on a selected crossbar array. As an alternative or in addition to retrieving, and executing instructions, the DPE enabled processor may include one or more electronic circuits that include electronic components for performing the functionality of one or more instructions, e.g., a Field Programmable Gate Array (FPGA) or Application Specific Integrated Circuit (ASIC). The processor may further include memory for storing executable instructions, and/or couple to a separate storage medium. The processor may be electronically coupled via electronic circuit to a DAC to program a column of the crossbar array 200. The processor may be electronically coupled via electronic circuit to a DAC to apply data values as voltages to the crossbar array. The processor may be electronically coupled via an electronic circuit to an ADC to receive an output from the crossbar array 200. The processor may be electrically coupled to a memory register or cache to retrieve input vector data. The data may be static, or may be updated periodically, for example in a data streaming context.

Figure 1B:
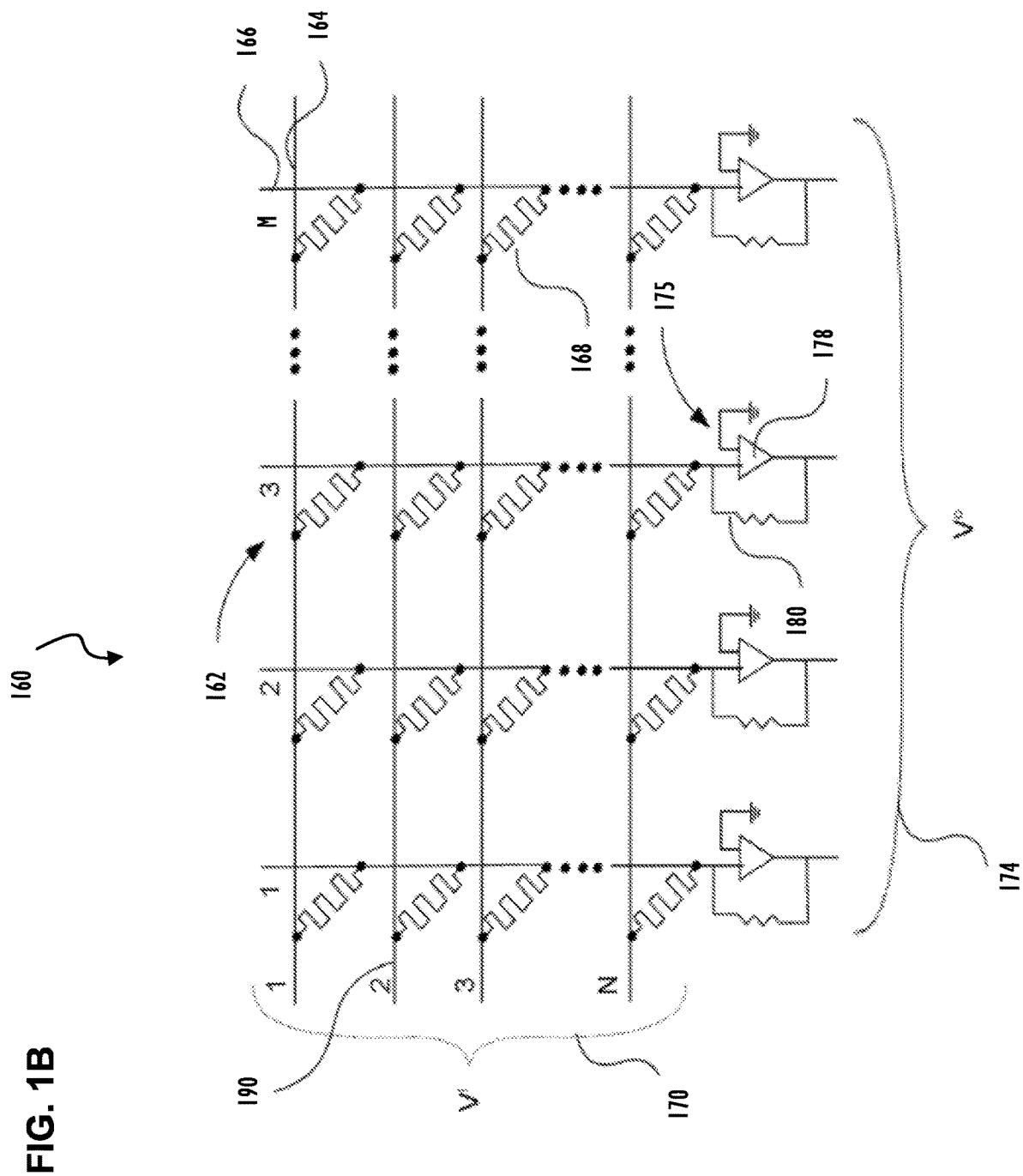
FIG. 1B is a schematic view of an example Dot Product Engine (DPE) for an IC as shown in FIG. 1A, according to one or more disclosed example implementations.

Referring now to FIG. 1B, DPE 160 is illustrated with an example schematic view including some of the functional elements (e.g., hardware components and logic) discussed above. DPE 160 is only an example and not intended to represent all possible schematic implementations for a DPE that may be used to implement disclosed principles. DPE 160 is illustrated as having a single vector of voltage inputs according to one example of the principles disclosed herein.

DPE 160 includes a crossbar array 162 including N row electrodes 164 and M column electrodes 166. The crossbar junctions throughout the crossbar array 162 include a memristive element 168. DPE 160 includes a vector input register or vector input 170 for applying voltages to the row electrodes 164 and a vector output register or vector output 174 for receiving output voltages resulting from current flows in the column electrodes 166. DPE 160 also includes sense circuitry 175 for converting an electrical current in a column electrode 166 to a voltage. In an example of the principles described herein, the sense circuitry 175 includes an operational amplifier 178 and a resistor 180, which can be arranged to represent a virtual ground for read operations.

DPE 160 may also include other peripheral circuitry associated with crossbar arrays 162 used as storage devices. For example, the vector input 170 may include drivers connected to the row electrodes 164. An address decoder can be used to select a row electrode 164 and activate a driver corresponding to the selected row electrode 164. The driver for a selected row electrode 164 can drive a corresponding row electrode 164 with different voltages corresponding to a vector-matrix multiplication or the process of setting resistance values within the memristive elements 168 of the crossbar array 162. Similar driver and decoder circuitry may be included for the column electrodes 166. Control circuitry may also be used to control application of voltages at the inputs and reading of voltages at the outputs of DPE 160. Digital to analog circuitry and analog to digital circuitry may be used at the vector inputs 170 and at the vector output 174. Input signals to the row electrodes 164 and column electrodes 166 can be either analog or digital. The peripheral circuitry described above can be fabricated using semiconductor processing techniques in the same integrated structure or semiconductor die as the crossbar array 162 in the above example.

As described in further detail below, there are at least two main operations that occur during operation of DPE 160 when used according to disclosed example implementations. The first operation is to program the memristors in the crossbar array so as to map the mathematic values in an N×M matrix to the array. In one example, only one memristor is programmed at a time during the programming operation. The second operation is the dot-product or matrix multiplication operation. In this operation, input voltages are applied, and output voltages obtained, corresponding to the result of multiplying an N×M matrix by an N×1 vector. The input voltages are typically applied below the threshold of the programming voltages so the resistance values of the memristors in the array 162 are not changed during the matrix multiplication operation.

In one example of a dot-product engine operation according to the principles described herein, vector and matrix multiplications may be executed through the dot-product engine 160 by applying a set of input voltages 170 (identified further by $V^I$ in FIG. 1B) simultaneously along the row electrodes 164 of the N×M crossbar array 162 and collecting the currents through the columns 166 and measuring the output voltages 174 (identified further by $V^o$ in FIG. 1B). On each column, every input voltage (170) is weighted by the corresponding memristance (Gij) and the weighted summation is reflected at the output voltage (174). Using Ohm's law, the relation between the input voltages 170 and output voltages 174 can be represented by a vector matrix multiplication of the form: $\{V^\circ\}^T = -\{V^I\}^T [G] R_s$, where Gij is an N×M matrix determined by the conductance (inverse of resistance) of the crossbar array 162, $R_s$ is the resistance value of the sense amplifiers and T denotes the transpose of the column vectors $V^\circ$ and $V^I$. The negative sign follows from use of a negative feedback operational amplifier in the sense amplifiers. From the foregoing, it follows that DPE 160 may be utilized for vector processing and, more specifically, for multiplying a first vector of values $\{b_i\}^T$ by a matrix of values $[a_{ij}]$ to obtain a second vector of values $\{c_i\}^T$, where i=1,N and j=1,M. The vector operation can be set forth in more detail as shown in Equation 1 represented below.

$$a_{11}b_1 + a_{21}b_2 + \ldots + a_{N1}b_N = c_1 \ldots a_{1M}b_1 + a_{2M}b_2 + \ldots + a_{NM}b_N = c_M.$$

Equation 1

The vector processing or multiplication using the principles described herein generally starts by mapping a matrix of values $[a_{ij}]$ onto the crossbar array 162 or, stated otherwise, programming—e.g., writing—conductance values Gij into the crossbar junctions of the array 162. With reference still to FIG. 1B, in one example, each of the conductance values Gij is set by sequentially imposing a voltage drop over each of the, crossbar junctions. For example, the conductance value $G_{2,3}$ may be set by applying a voltage equal to $V_{Row2}$ at the 2nd row of the crossbar array 162 and a voltage equal to $V_{Col3}$ at the 3rd column of the array 162. In one example, the voltage input, $V_{Row2}$, will be applied to the 2nd row at a location 190 occurring at the 2nd row electrode adjacent the j=1 column electrode. The voltage input, $V_{Col3}$, will be applied to the 3rd column electrode adjacent either the i=1 or i=N location. Note that when applying a voltage at a column electrode 166, the sense circuitry 176 for that electrode may be switched out and a voltage driver switched in. The voltage difference $V_{Row2} - V_{Col3}$ may be used to determine the resulting conductance value $G_{2,3}$ based on the characteristics of the memristive element 168 located at the intersection. When following this approach, the unselected columns 166 and rows may be addressed according to one of several schemes, including, for example, using them as part of the disclosed variable precision technique, floating all unselected columns 166 and rows 164, or grounding all unselected columns 166 and rows 164. Other schemes involve grounding columns 166 or grounding partial columns 166. Grounding all unselected columns 166 and rows 164 may be beneficial in that this methodology helps to isolate the unselected columns 166 and rows 164 to minimize the sneak path currents to the selected output column 166. Following programming, operation of DPE proceeds by applying the vector of input voltages 170 and reading the vector of output voltages 174.

In accordance with one example of the principles disclosed herein, the memristors used for DPE 160 have a linear current-voltage relation. Linear current-voltage relations permit higher accuracy in the vector multiplication process. However, crossbar arrays 162 having linear memristors are prone to having large sneak path currents during programming of the array 162, particularly when the size of the crossbar array 162 is larger than a certain size, for instance, 32×32. In such cases, the current running through a selected memristor may not be sufficient to program the memristor because most of the current runs through the sneak paths. Alternatively, the memristor may be unintentionally programmed at an inaccurate value because of the sneak paths. To alleviate the sneak path currents in such instances, and especially when larger arrays are desired, an access device, such as a non-linear selector or transistor (e.g., a normally ON depletion mode transistor) may be incorporated within or utilized together with the memristive element 168 to minimize the sneak path currents in the array. More specifically, the memristive element 168 should be broadly interpreted to include memristive devices including, for example, a memristor, a memristor and selector, or a memristor and transistor.

Figure 2:
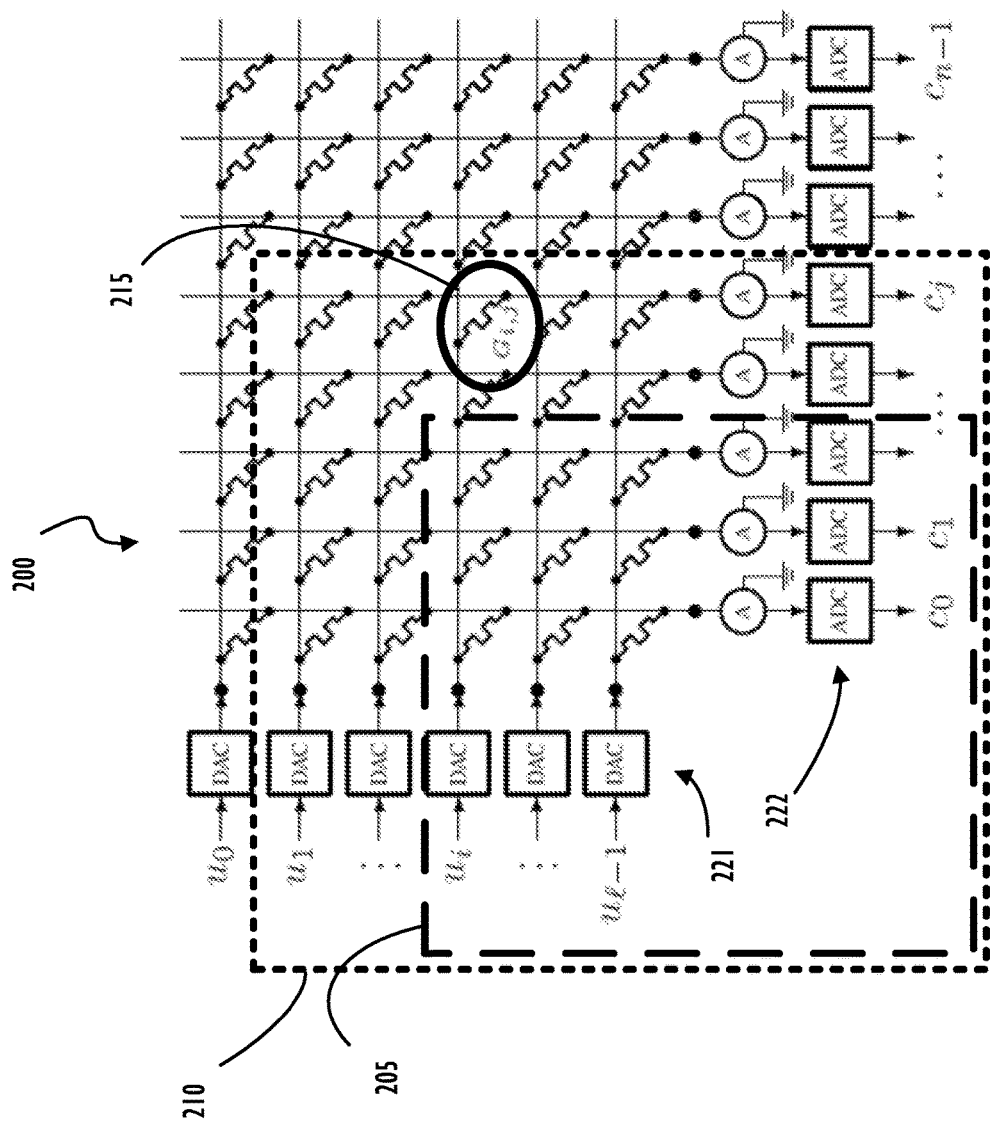
FIG. 2 is a diagram illustrating a division of a crossbar matrix of a DPE with a first precision portion (e.g., matrix multiplication at a first precision) and a second precision portion for a more precise calculation (e.g., using a larger area of the crossbar matrix), according to one or more disclosed example implementations.

Referring now to FIG. 2, example DPE implementation 200 is illustrated as a schematic diagram including a division of a crossbar matrix of a DPE with a first precision portion 205 (e.g., matrix multiplication at a first precision) and a second precision portion 210 for a more precise calculation (e.g., using a larger area of the crossbar matrix), according to one or more disclosed example implementations. Using a larger area may allow for using a higher bit precision for a calculation or for application of error correcting algorithms utilizing the additional resources (e.g., rows and/or columns). Because of the design of the DPE, different amounts of the DPE may be provided power as appropriate for different levels of precision. That is, each portion of the matrix crossbar array may be used and properly function independently of other portions of the matrix crossbar array.

As explained above and further illustrated in DPE 200, a crossbar array may include "l" row electrodes and "n" column electrodes. The crossbar junctions throughout the crossbar array 200 include a memristive element at each intersection. The dot-product engine 160 includes a vector input register or vector input for applying voltages to the row electrodes and a vector output register or vector output for receiving output voltages resulting from current flows in the column electrodes. Additionally, the dot-product engine (e.g., 160 or 200) may include input registers for columns to adjust the columns conductance (e.g., program the crossbar array for conductance values representative of a first input matrix).

The vector input may be coupled to digital to analog convertors (DAC) 221 to convert digital values to analog values for writing to the crossbar array 160 or 200. The vector output may include analog to digital converters (ADCs) 222 to convert analog values to digital values. In some implementations, the precision of these converters may be adjusted to conserve compute resources alone or in conjunction with other disclosed techniques to vary precision. The dot-product engine 200 may also include sense circuitry for converting an electrical current in a column electrode to a voltage. In an example, the sense circuitry may include an operational amplifier and a resistor, which can be arranged to represent a virtual ground for read operations.

Dot-product engine 200 may also include other peripheral circuitry associated with crossbar arrays used as storage devices. For example, the vector input may include drivers connected to the row electrodes. An address decoder can be used to select a row electrode and activate a driver corresponding to the selected row electrode. The driver for a selected row electrode can drive a corresponding row electrode with different voltages corresponding to a vector-matrix multiplication or the process of setting resistance values within the memristive elements of the crossbar array (again programming values representative of a first input matrix). Similar driver and decoder circuitry may be included for the column electrodes.

Control circuitry may also be used to control application of voltages at the inputs and reading of voltages at the outputs of the dot-product engine 200. Digital to analog circuitry 221 and analog to digital circuitry 222 may be used at the vector inputs and at the vector output. Input signals to the row electrodes and column electrodes can be either analog or digital. The peripheral circuitry above described can be fabricated using semiconductor processing techniques in the same integrated structure or semiconductor die as the crossbar array 200 in the above example. As described in further detail below, there are at least three main operations that occur during operation of the dot-product engine with the disclosed variable precision capability, in some implementations of this disclosure. The first operation is to determine a desired precision of calculation. The second operation is to program the appropriate (e.g., based on degree of precision) memristors in the crossbar array so as to map the mathematic values in an N×M matrix to the array (e.g., set conductance at a crossbar junction). In one example, only one memristor is programmed at a time during the programming operation. The third operation is the dot-product or matrix multiplication operation. To perform a matrix multiplication on a DPE, input voltages are applied, and output voltages obtained, corresponding to the result of multiplying an N×M matrix by an N×1 vector. The input voltages may be configured to be below the threshold of the programming voltages so the resistance values of the memristors as programmed into the array (e.g., input matrix 1) are not changed during the matrix multiplication operation.

As explained above with reference to FIGS. 1A-B, input to the vector input register may be a vector of voltages (e.g., representative of input matrix 2 below the programming threshold and input matrix 1 at above the programming threshold). Input to the column input register may be an array of conductances. The vector output register may be a vector of currents.

The dot-product engine 200 may be electronically coupled to one or more additional processors, shift registers, or memory areas, etc. (see FIG. 1). As explained above, the dot-product system may include at least three modes of operation: 1) determination of precision, 2) programming memristor array analog values, and 3) dot-product computation. If an array of voltage signals is applied to the rows of a crossbar via vector input, the current measured at a column will be a weighted summation of the inputs with each input being multiplied by the conductance or 'weight' of the corresponding cross-point memristive device. Multiply-add operation may be performed concurrently in all the layers and the resulting currents may be summed at the output using CMOS circuitry.

As explained above (and re-iterated here in the context of the example of FIG. 2), in some disclosed implementations of a DPE, the matrix A is realized as a crossbar array consisting of l row conductors, n columns conductors, and programmable nanoscale resistors (e.g., memristors) at the junctions, with the resistor at the junction (i, j) set to have conductance, $G_{i,j}$ (illustrated at area 215 of FIG. 2), that is proportional to $a_{i,j}$. Each entry $u_i$ of u is fed into a digital-to-analog converter (DAC) 221 to produce a voltage level that is proportional to $u_i$. The product, uA, may then be computed by reading the currents at the (grounded) column conductors, after being fed into analog-to-digital converters (ADCs) 222.

Figure 3:
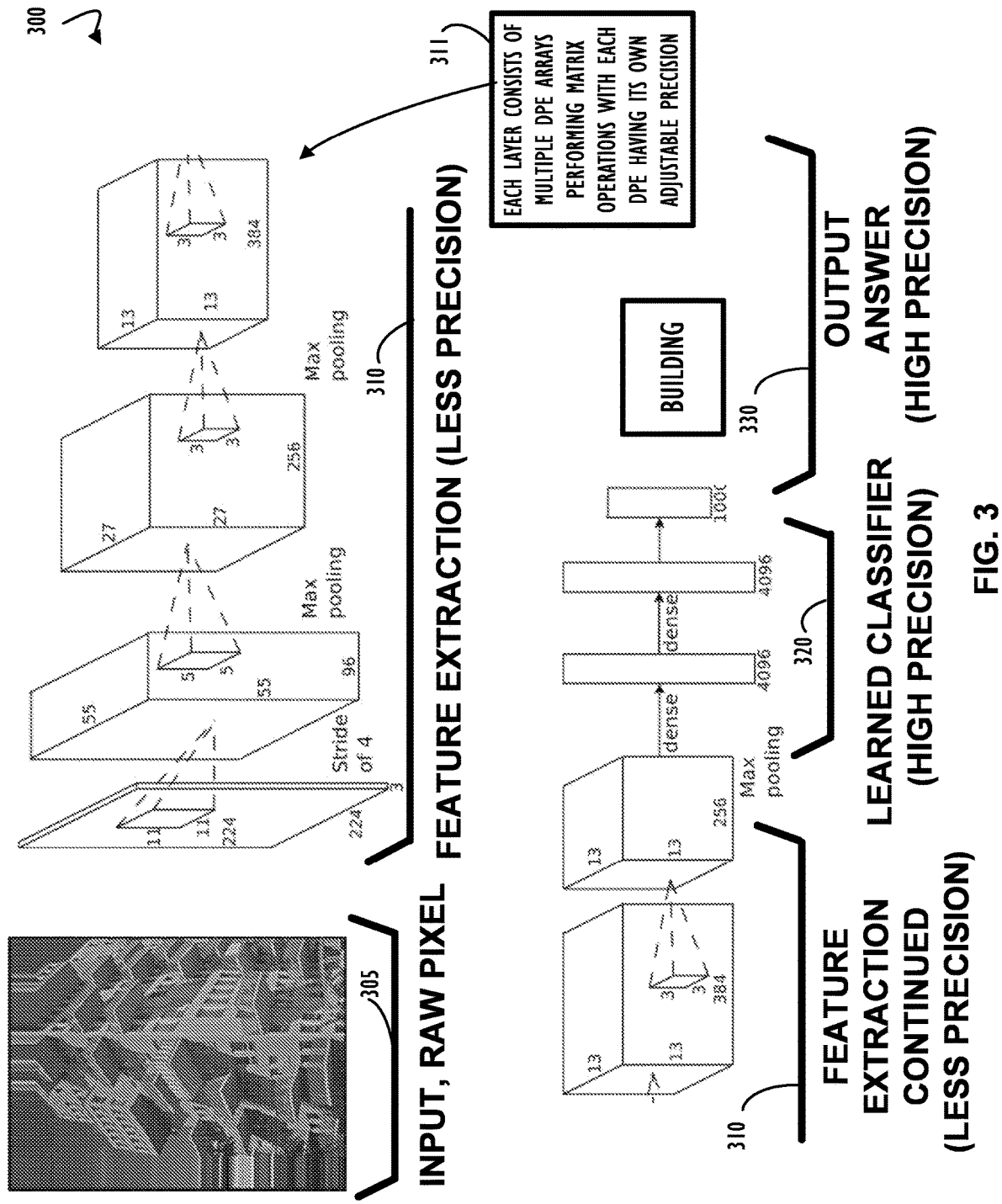
FIG. 3 illustrates an image processing process with multiple steps where different steps in the image processing pipeline may utilize different levels of precision, according to one or more disclosed example implementations.

With reference to FIG. 3, the disclosed approach to variable precision for multi-stage processors (e.g., implemented using DPE processors) may provide an image processing process with multiple steps where different steps in the image processing pipeline may utilize different levels of precision, according to one or more disclosed example implementations. The example ordering of less precision and high precision steps is for illustration only. In real world implementations of neural networks, the precision may show an opposite trend or alternate amounts of precision between steps. According to disclosed implementations, there may also be a dynamic approach to adjust (e.g., at run-time) the computational precision on a per-stage basis (311). The multi-stages may refer to stages in a computational pipeline, such as layers in Neural Network computations, or the image processing pipeline 300. In these cases, as well as others, some lower layers (e.g., feature extraction 310) can be much less precise than higher layers (fully-connected classifying layers 320). Note this is contrary to what one might expect because some current implementations of graphics pipelines that are manually tuned use high precision for feature extraction 310 and less precision for the learned classifier 320.

Image processing pipeline 300 represents an example of a set of related computational stages that may work together (in series or in parallel) to produce an overall result. In the image processing example, the process may begin with input of raw pixel data (305). After the raw pixel data is obtained, a feature extraction process 310 may be performed to determine attributes of the image being processed. As illustrated in pipeline 300, the feature extraction process may include a number of different calculations, perhaps on different portions of the input image, and result in an overall set of features extracted from the input image. After feature extraction 310 is completed (possibly with a low degree of precision), a learned classifier process 320 may be performed. As in this example, learned classifier process 320 may be performed with a high degree of precision and therefore utilize more processing resource than was used for calculations performing feature extraction 310. Finally, an output answer 330 may be calculated (again with a high precision setting). Thus, the application developer, or prepared libraries, may request a desired level (or degree) of precision for different calculations (as illustrated at block 311) based on a desired "stage" accuracy required with respect to the overall result accuracy.

Figure 4A:
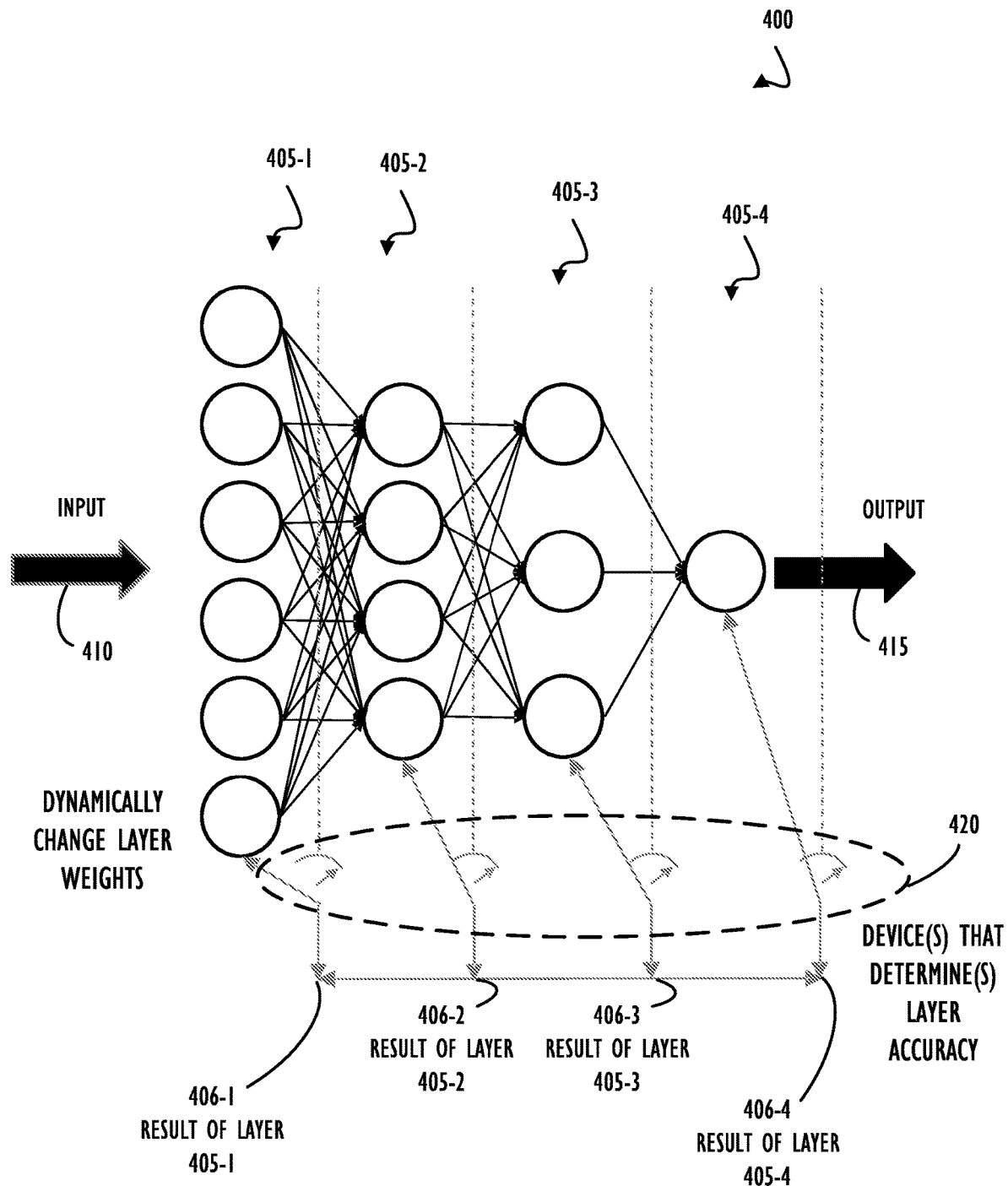
FIG. 4A illustrates a neural network with multiple layers and a technique to determine different precision levels for different layers of the neural network (e.g., different stages of a multi-stage process), according to one or more disclosed example implementations.

Turning now to FIG. 4A a neural network 400 is illustrated as interconnecting circles (representing neurons of a neural network) divided into multiple layers (405-1, 405-2, 405-3, and 405-4). FIG. 4A also illustrates a technique to determine, for example through supervised training, different precision levels for different layers 405-1 to 405-4 of the neural network (e.g., different stages of a multi-stage process), according to one or more disclosed example implementations. Input 410 represents one or more sets (e.g., streams) of input data that may be presented one or more times to a neural network under test (e.g., training). Output 415 represents output of the overall neural network (and its processing) for a given input stream. Neural network 400 begins at layer 405-1 where input 410 is processed to produce outputs (e.g., results of layer 405-1 represented at 406-1 in FIG. 4A). Each of layers 405-2, 405-3, and 405-4 have corresponding results 406-2, 406-3, and 406-4, respectively. Output from a previous layer may be provided as input to the next subsequent layer. For simplicity, neural network 400 is illustrated with inputs flowing only forward to a next layer, however, in some situations there may be a loop-back of results. That is, a result of layer 2 may be an input to layer 1 for a subsequent calculation.

Continuing with FIG. 4A, the area represented by dashed line 420 illustrates that each layer may have a device (or devices) that determine layer accuracy (for example using supervised training results). As illustrated, layer accuracy may be determined on a per-layer basis as well as determining an overall result accuracy. In one implementation, an automated system in supervised training mode may run a set of "passes" through neural network 400 while varying precision at each layer for each pass. Precision may be adjusted individually such that different layers have different precision settings for a given pass of input training data. After running different passes at different precision layers, it may be determined that a layer of neural network 400 works well within a given range of precision settings. For example, layer 2 405-2 may perform well at 8-bit or higher precision whereas layer 4 405-4 requires 32-bit precision to produce results of a desired accuracy. Each layer may then be "tuned" or provided a set of usable precision settings (or a minimum required) for later selection in a production version of neural network 400. In this manner, multiple passes with different combinations of precision settings may be used to identify desirable precision levels (or lowest acceptable precision levels) so that run-time adjustments may be made. For example, run-time dispatching of processing may take into account these pre-determined precision ranges when determining where (and how) to execute a compute task based on run-time conditions such as load and power usage requirements.

Figure 4B:
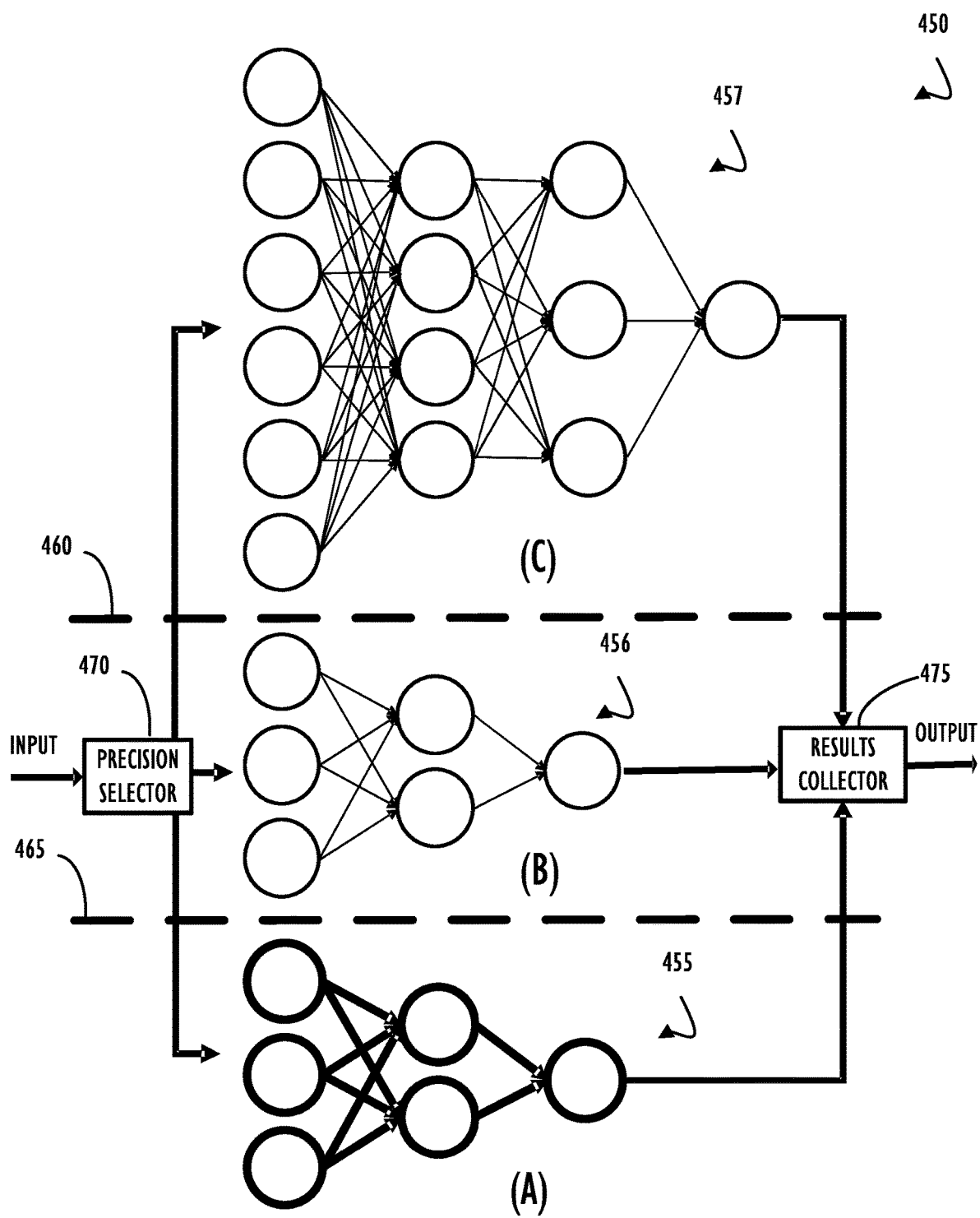
FIG. 4B illustrates a dispatching technique to direct different input streams (e.g., representing inputs for different stages of a multi-stage process) to different neural networks configured with different precision levels for processing of different layers of the neural network, according to one or more disclosed example implementations.

FIG. 4B illustrates a dispatching technique 450 to direct different input streams (e.g., representing inputs for different stages of a multi-stage process) to different neural networks configured with different precision levels for processing of different layers of the neural network, according to one or more disclosed example implementations. In example technique 450, input is received at precision selector 470. Prior to providing input for processing, precision selector 470 may decide which "version" of a neural network is configured with the appropriate precision for processing that input stream. Precision selector 470 may utilize multiple factors to make this determination. For example, precision selector 470 may utilize information about the acceptable precision levels for a given type of input stream as determined during training of the neural network (e.g., as in FIG. 4A). Also, precision selector 470 may utilize load balancing type information to take into account availability of resources for performing processing of this set of input data.

In the example of FIG. 4B, neural network A (455), neural network B (456), and neural network C (457) are examples of the "same" neural network configured with different levels of precision at different layers of the neural network. That is, they each represent different instances of substantially similar neural networks. Dashed lines 460 and 465 illustrate delineation between the different instances. Results collector 475 represents a correlation point for the single input stream to be provided as a single output stream. In this manner, other processing components or subsystems need not be aware of how processing was actually performed "under the covers" of dispatching technique 450. In general, a processing system may be configured with any number of implementations of a neural network (or different neural networks) and a determination may be made at run-time to determine the "best fit" for processing an input to the processing system.

Figure 5A:
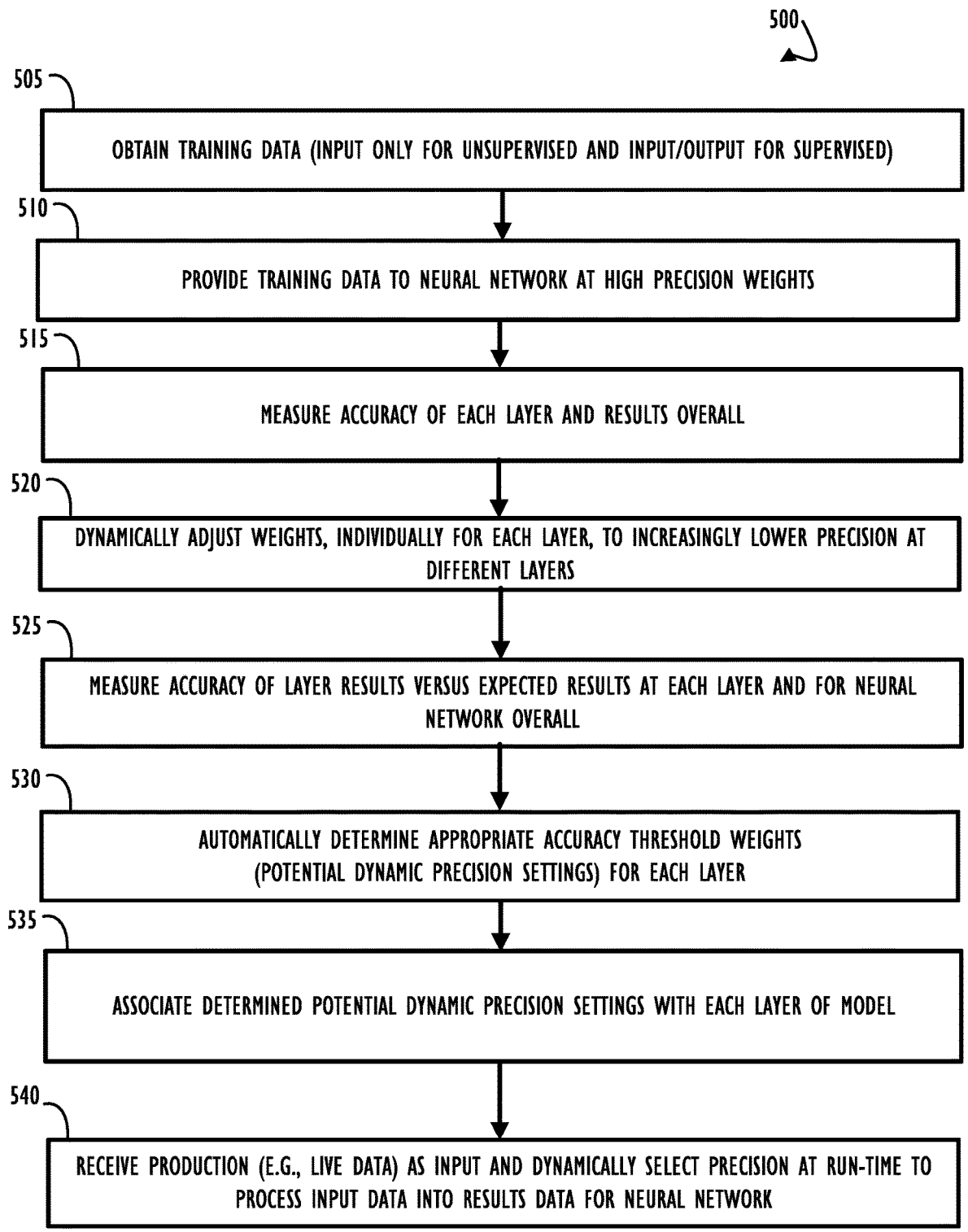
FIG. 5A illustrates a flowchart of an example method of performing a dynamically adjustable precision for different stages of a multi-stage compute process using a memristor crossbar, according to one or more disclosed example implementations.

FIG. 5A illustrates a flowchart 500 of an example method of performing a dynamically adjustable precision for different stages of a multi-stage compute process, for example, using a memristor crossbar, according to one or more disclosed example implementations. FIG. 5 represents an example method that may be executed on a computing device having both a processor (e.g., general purpose processor) and a DPE that may be used as an accelerator for matrix multiplication, according to one or more disclosed example implementations. For example, method 500 may be used as part of a digital image processing pipeline as discussed above in FIG. 3. In that example, method 500 may be repeated multiple times for each "phase" of the processing at different stages of the pipeline. In areas of computation that need more accuracy, the obtained precision indicator may be higher and therefore utilize more rows/columns of the DPE crossbar for calculation (refer to FIG. 2 discussed above). In contrast, areas of processing that need less accuracy may benefit from "improved" overhead by reducing the number of rows/columns to a number near the number required for the matrix calculation itself. In general, disclosed example implementations allow a system to dynamically adjust its accuracy to affect one of the performance "levers" commonly referred to as: "area," "power," and "accuracy," which each compete for system resources. For example, "power" and "area" may be increased to increase "accuracy" when more calculations are being performed, but "power" may be conserved (perhaps resulting in a longer expected battery life for a portable device) when a lesser degree of accuracy will suffice for a specific calculation. Thus, the disclosed techniques represent an improvement to the technological field of computational accuracy and efficiency by providing additional flexibility to an end-user (e.g., program designer).

Flowchart 500 begins at block 505 where training data may be obtained. For supervised training mode both input data and associated expected results may be obtained and for unsupervised training only input data may be used. With supervised training, automatic analysis of results versus expected results may be performed and with unsupervised training other techniques (including manual analysis) may be used. Block 510 indicates that training data may initially be provided to a neural network (e.g., neural network 400) with high precision weights. Block 515 indicates that a measure of accuracy may be performed for each layer of the neural network as well as for the neural network as a whole. For example, results of a high-accuracy precision setting may be stored for later comparison to a lower-accuracy precision. Storing of results from higher precision and comparing to lower precision results may be beneficial as a method to at least partially automate validation of unsupervised training data. Block 520 indicates that weights may be dynamically adjusted for each layer of the neural network (and for different passes of the same input data). For example, to increasingly lower precision at different layers to determine a minimal acceptable precision for each layer. Block 525 indicates that, after dynamic adjustment, accuracy measurements may again be performed (similar to block 515) for each layer of the neural network and the overall results. Block 530 indicates that an automatic determination may be made as to an appropriate accuracy threshold (or range of potential dynamic precision settings that are acceptable) for each layer. Block 535 indicates that an association may be made between layers of the model and potential dynamic precision settings (possibly with respect to a type of input data). Block 540 indicates that, after training is complete, a neural network may go "live" in a production environment to receive live data and dynamically select precision at run-time to process input data into results for the production neural network. For example, using techniques disclosed herein to automatically select an appropriate precision level at run-time for a particular stage of a multi-stage process being executed.

Figure 5B:
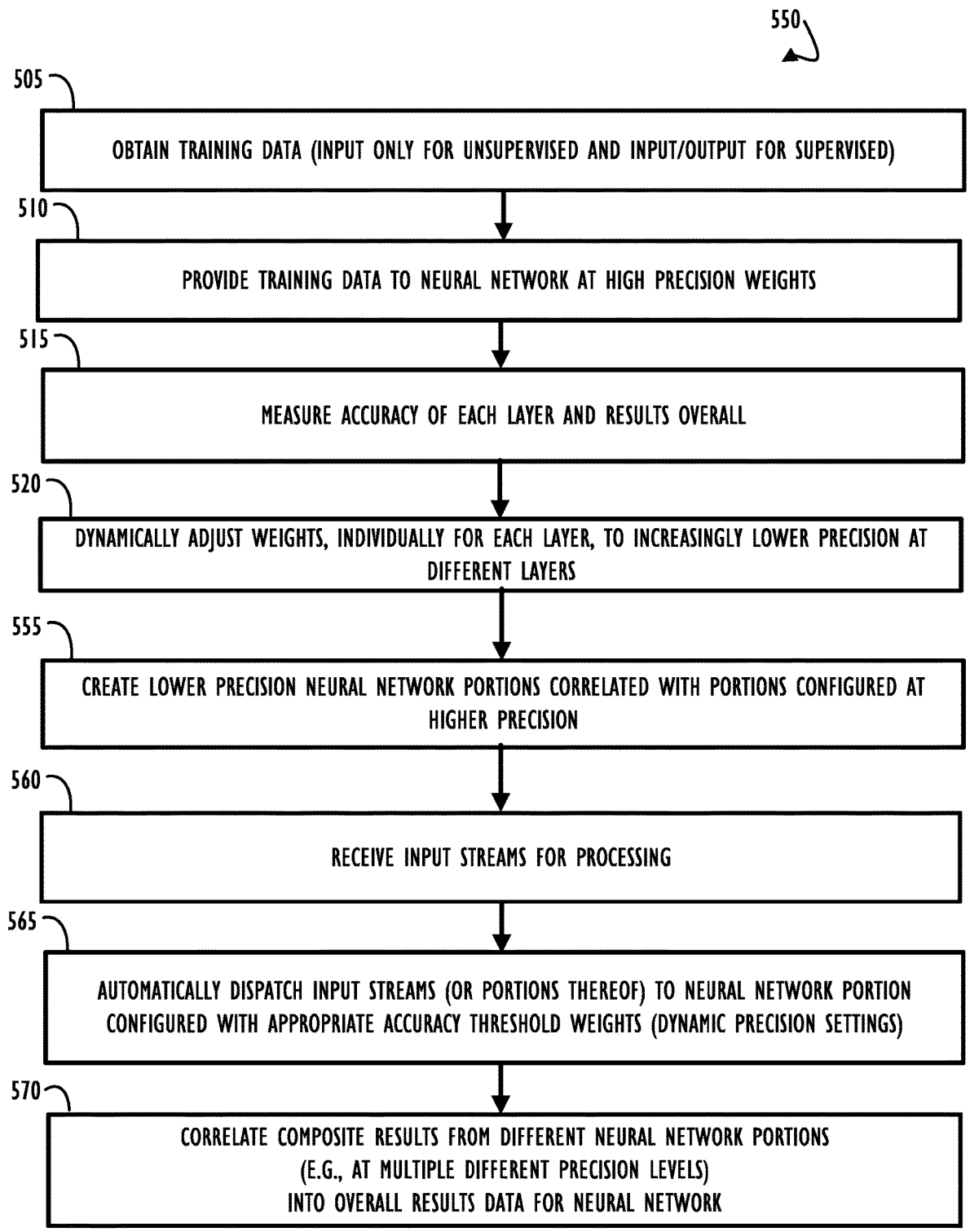
FIG. 5B illustrates a flowchart of an example method of performing a dispatching technique for different stages of a multi-stage compute process, for example using a memristor crossbar, according to one or more disclosed example implementations.

FIG. 5B illustrates a flowchart 550 of an example method of performing a dispatching technique (See FIG. 4B) for different stages of a multi-stage compute process, for example using a memristor crossbar, according to one or more disclosed example implementations. Flowchart 550 begins with blocks 505, 510, 515, and 520 described above with reference to FIG. 5A. Block 555 indicates that different precision instances of a neural network may be configured for a processor. For example, multiple instances of the same neural network (or substantially similar) with either a higher or lower precision setting for different layers of the neural network than the base instance. Block 560 indicates that one or more input streams may be received for processing. Block 565 indicates that input streams may be automatically dispatched (e.g., via precision selector 470 of FIG. 4B) to a neural network appropriate for the determined precision desired for this input stream at the time of dispatching. Block 570 indicates that results may be collected after dispatching (e.g. via results collector 475 of FIG. 4B) to produce an overall result for the neural network.

Figure 6:
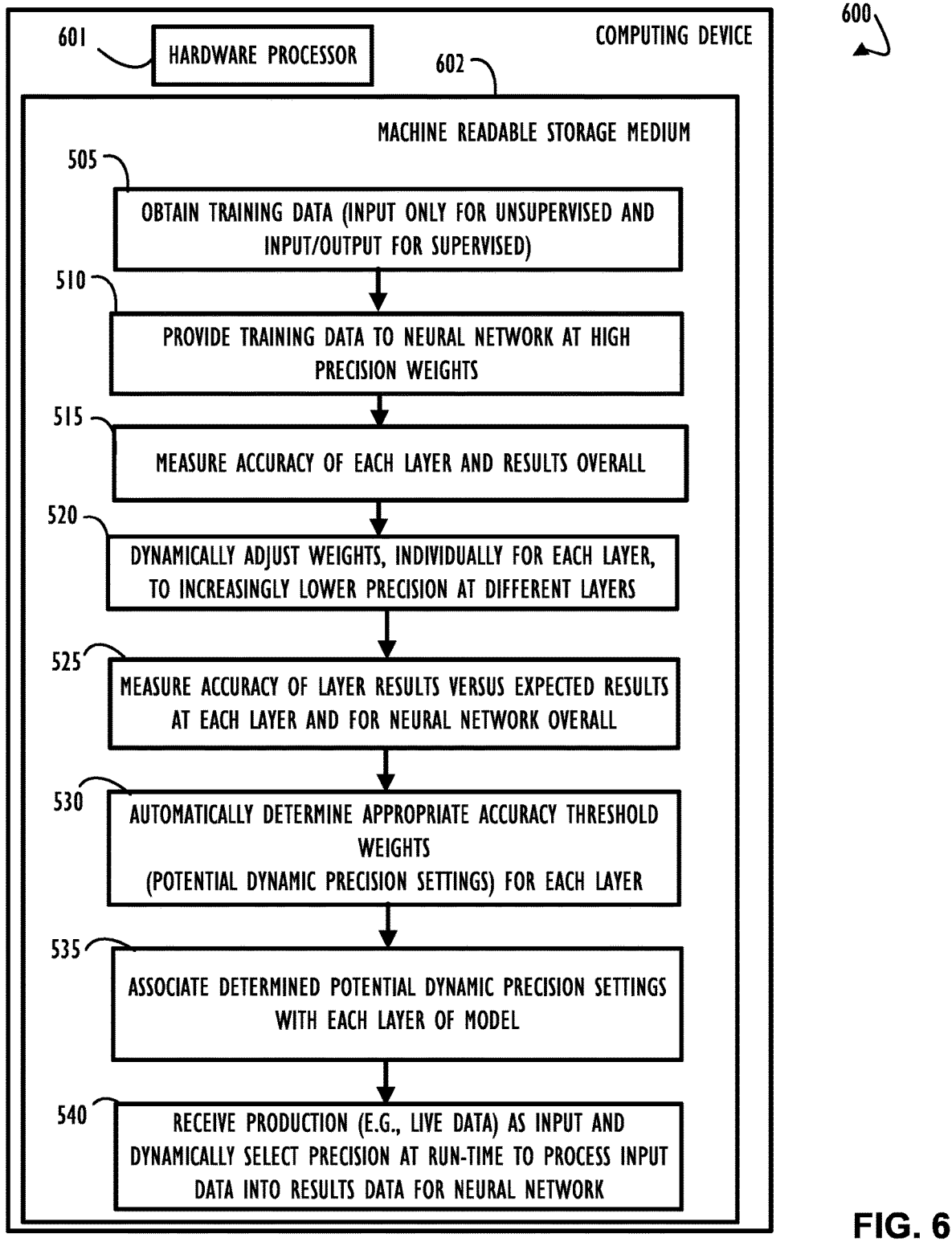
FIG. 6 is an example computing device with a hardware processor and accessible machine-readable instructions for performing dynamically adjustable precision for different stages of a multi-stage compute process, according to one or more disclosed example implementations.

FIG. 6 is an example computing device 600, with a hardware processor 601, and accessible machine-readable instructions stored on a machine-readable medium 602 for performing dynamically adjustable precision for different stages of a multi-stage compute process, according to one or more disclosed example implementations. FIG. 6 illustrates computing device 600 configured to perform the flow of flowchart 500 as an example. However, computing device 600 may also be configured to perform the flow of flowchart 550 or other methods, techniques, functions, or processes described in this disclosure. In this example of FIG. 6, machine-readable storage medium 602 includes instructions to cause hardware processor 601 to perform blocks 505-540 discussed above with reference to FIG. 5A.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

The foregoing description, for purposes of explanation, used specific nomenclature to provide a thorough understanding of the disclosure. However, it will be apparent to one skilled in the art that the specific details are not required to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

We claim:

1. A computer-implemented method of processing a multi-stage compute process, the method comprising:
obtaining a multi-stage compute process for processing in a training mode, wherein results of a first stage of the multi-stage compute process provide input to a second stage of the multi-stage compute process;
processing the first stage on a first hardware processor at a first degree of precision to obtain first initial results;
analyzing the first initial results to determine a first accuracy result of the first stage;
processing the first stage on the first hardware processor at a second degree of precision to obtain first secondary results, wherein the second degree of precision is less than the first degree of precision;
analyzing the first secondary results to determine a second accuracy result of the first stage;
determining that the second accuracy result is within a first threshold of accuracy relative to the first accuracy result;
storing the second degree of precision as a first acceptable degree of precision for the first stage;
processing the second stage on the first hardware processor at a third degree of precision to obtain second initial results;
analyzing the second initial results to determine a third accuracy result of the second stage;
processing the second stage on the first hardware processor at a fourth degree of precision to obtain second secondary results, wherein the fourth degree of precision is less than the third degree of precision;
analyzing the second secondary results to determine a fourth accuracy result of the second stage;
determining that the fourth accuracy result is within a second threshold of accuracy relative to the third accuracy result; and
storing the fourth degree of precision as a second acceptable degree of precision for the second stage,
wherein analyzing the first and second initial results and the first and second secondary results is performed automatically by a processor of a computer system.

2. The computer-implemented method of claim 1, wherein the first hardware processor comprises a dot product engine (DPE) processor.

3. The computer-implemented method of claim 2, wherein precision for the DPE processor is adjusted by selectively providing power to selected rows and columns of a crossbar architecture.

4. The computer-implemented method of claim 2, wherein precision for the DPE processor is adjusted by reducing precision of at least one analog to digital converter (ADC) or at least one digital to analog converter (DAC).

5. The computer-implemented method of claim 1, wherein the first hardware processor comprises a graphics processing unit (GPU).

6. The computer-implemented method of claim 1, wherein the multi-stage compute process comprises a neural network with one or more layers of the neural network representing a stage in the multi-stage compute process.

7. The computer-implemented method of claim 1, wherein the multi-stage compute process comprises a graphics processing pipeline with one or more functions of the graphics pipeline representing a stage in the multi-stage compute process.

8. The computer-implemented method of claim 1, wherein the first degree of precision and the third degree of precision are the same degree of precision.

9. The computer-implemented method of claim 1, wherein the second degree of precision and the fourth degree of precision are different degrees of precision.

10. The computer-implemented method of claim 1, wherein the training mode comprises a supervised training mode, wherein the supervised training mode uses inputs and associated pre-determined outputs.

11. The computer-implemented method of claim 1, wherein the training mode comprises an unsupervised training mode and outputs from processing at the first degree of precision are used as a supervised training mode predetermined output for analyzing the first secondary results.

12. The computer-implemented method of claim 1, wherein the multi-stage compute process is deployed in production mode and configured to utilize the first acceptable degree of precision for the first stage and the second acceptable degree of precision for the second stage.

13. The computer-implemented method of claim 12, wherein the first acceptable degree of precision is different than the second acceptable degree of precision and a second hardware processor is dynamically adjusted to the first acceptable degree of precision to process the first stage and dynamically adjusted to the second acceptable degree of precision to process the second stage.

14. The computer-implemented method of claim 12, wherein the first stage is dispatched for processing on a second hardware processor configured to process at the first acceptable degree of precision and the second stage is dispatched for processing on a third hardware processor configured to process at the second acceptable degree of precision, wherein the second hardware processor and the third hardware processor are different hardware processors.

15. The computer-implemented method of claim 14, wherein the second hardware processor and the third hardware processor are on the same integrated circuit.

16. The computer-implemented method of claim 1, further comprising:
processing the second stage on the first hardware processor at a fifth degree of precision to obtain third secondary results, wherein the fifth degree of precision is less than the fourth degree of precision;
analyzing the third secondary results to determine a fifth accuracy result of the second stage;
determining that the fifth accuracy result is within the second threshold of accuracy relative to the third accuracy result; and
storing the fifth degree of precision as a third acceptable degree of precision for the second stage.

17. The computer-implemented method of claim 1:
wherein the multi-stage compute process comprises: a neural network compute process; deployed in production mode; and configured to utilize the first acceptable degree of precision for the first stage and the second acceptable degree of precision for the second stage; and
wherein the first stage is dispatched for processing on a first neural network instance configured to process at the first acceptable degree of precision and the second stage is dispatched for processing on a second neural network instance configured to process at the second acceptable degree of precision, wherein the first neural network instance and the second neural network instance represent a single neural network model.

18. The computer-implemented method of claim 1, wherein the first degree of precision and the third degree of precision are 32-bit precision, the second degree of precision is 8-bit precision, and the fourth degree of precision is 16-bit precision.

19. A non-transitory computer readable medium comprising computer executable instructions stored thereon that when executed by one or more processing units, perform a method to process a multi-stage compute process, the method comprising:
obtaining a multi-stage compute process for processing in a training mode, wherein results of a first stage of the multi-stage compute process provide input to a second stage of the multi-stage compute process;
processing the first stage on a first hardware processor at a first degree of precision to obtain first initial results;
analyzing the first initial results to determine a first accuracy result of the first stage;
processing the first stage on the first hardware processor at a second degree of precision to obtain first secondary results, wherein the second degree of precision is less than the first degree of precision;
analyzing the first secondary results to determine a second accuracy result of the first stage;
determining that the second accuracy result is within a first threshold of accuracy relative to the first accuracy result;
storing the second degree of precision as a first acceptable degree of precision for the first stage;
processing the second stage on the first hardware processor at a third degree of precision to obtain second initial results;
analyzing the second initial results to determine a third accuracy result of the second stage;
processing the second stage on the first hardware processor at a fourth degree of precision to obtain second secondary results, wherein the fourth degree of precision is less than the third degree of precision;
analyzing the second secondary results to determine a fourth accuracy result of the second stage;
determining that the fourth accuracy result is within a second threshold of accuracy relative to the third accuracy result; and
storing the fourth degree of precision as a second acceptable degree of precision for the second stage,
wherein analyzing the first and second initial results and the first and second secondary results is performed automatically by the one or more processing units.

20. The non-transitory computer readable medium of claim 19, wherein the first, second, third, and fourth degree of precision are selected from the group consisting of: 1-bit (binary) precision, ternary (3 states) precision, 8-bit precision, 16-bit precision, 32-bit precision, and 64-bit precision.

* * * * *